(12) United States Patent
Ogawa et al.

(10) Patent No.: US 11,840,115 B2
(45) Date of Patent: Dec. 12, 2023

(54) AXLE STRUCTURE

(71) Applicant: TOYOTA JIDOSHA KABUSHIKI KAISHA, Aichi-ken (JP)

(72) Inventors: Kazunori Ogawa, Toyota (JP); Akira Hirano, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 684 days.

(21) Appl. No.: 16/978,776

(22) PCT Filed: Mar. 8, 2019

(86) PCT No.: PCT/JP2019/009247
§ 371 (c)(1),
(2) Date: Sep. 8, 2020

(87) PCT Pub. No.: WO2019/172402
PCT Pub. Date: Sep. 12, 2019

(65) Prior Publication Data
US 2020/0406682 A1 Dec. 31, 2020

(30) Foreign Application Priority Data
Mar. 9, 2018 (JP) .................. 2018-042805

(51) Int. Cl.
*B60B 35/16* (2006.01)
*B60B 35/14* (2006.01)
*B60K 1/00* (2006.01)
(52) U.S. Cl.
CPC .............. *B60B 35/16* (2013.01); *B60B 35/14* (2013.01); *B60K 1/00* (2013.01); *B60K 2001/001* (2013.01)

(58) Field of Classification Search
CPC ............ B60K 2001/001; B60K 17/105; B60K 2007/0069; B60K 2007/0076; B60B 35/16; B60B 35/163; B60B 35/166
See application file for complete search history.

(56) References Cited

U.S. PATENT DOCUMENTS

| 1,223,495 A | * | 4/1917 | Kelley | ............... B60K 17/12 180/57 |
| 2,731,099 A | * | 1/1956 | Schroeder | ............... B60K 7/00 180/24.06 |
| 5,821,653 A | * | 10/1998 | Kinto | ............... B60K 1/00 310/58 |

(Continued)

FOREIGN PATENT DOCUMENTS

| CN | 202965824 U | 6/2013 |
| CN | 203078226 U | 7/2013 |

(Continued)

*Primary Examiner* — Emma K Frick
(74) *Attorney, Agent, or Firm* — HAUPTMAN HAM, LLP (57) ABSTRACT

An axle structure is provided with an axle housing for internally passing an axle shaft having wheels connected to both left and right ends thereof, and a drive motor unit. The axle housing includes a large diameter housing center portion having a recessed portion which is recessed from an opening portion on a front surface side toward a rear surface side, and small diameter hollow shaft portions connected as a left and right pair to both sides of the housing center portion. The drive motor unit is fitted into the recessed portion and is bolted to the axle housing by means of tightening bolts.

3 Claims, 4 Drawing Sheets

(56) References Cited

U.S. PATENT DOCUMENTS

| | | | | |
|---|---|---|---|---|
| 6,431,298 | B1* | 8/2002 | Ruppert, Jr. | B60K 17/04 180/297 |
| 6,991,571 | B2 | 1/2006 | Gady | B60K 1/02 475/5 |
| 7,115,058 | B2* | 10/2006 | Duncan | B60K 6/48 475/5 |
| 7,137,183 | B2* | 11/2006 | Stuart | B60K 17/16 29/434 |
| 7,314,105 | B2* | 1/2008 | Varela | B60K 7/0007 180/242 |
| 7,357,203 | B2* | 4/2008 | Morrow | B60K 6/40 180/65.1 |
| 7,588,508 | B2* | 9/2009 | Marsh | B60K 17/356 475/152 |
| 7,610,979 | B1* | 11/2009 | Dykowski | B62M 23/02 180/65.6 |
| 7,984,782 | B2* | 7/2011 | Platt | B60K 17/16 180/378 |
| 8,517,140 | B2* | 8/2013 | West | B60G 3/20 280/124.135 |
| 8,858,379 | B2* | 10/2014 | Keeney | H02K 7/1163 475/150 |
| 8,936,130 | B2* | 1/2015 | Hirashita | B66F 9/07586 180/300 |
| 9,145,961 | B2* | 9/2015 | Suzuki | F16H 37/065 |
| 9,221,496 | B2* | 12/2015 | Barr | B60K 17/16 |
| 9,649,923 | B2* | 5/2017 | Perlo | B60K 1/04 |
| 10,065,489 | B2* | 9/2018 | Wang | F16H 48/36 |
| 10,279,625 | B2* | 5/2019 | Kelly | F16H 57/032 |
| 10,500,940 | B2* | 12/2019 | Garcia | F16H 57/037 |
| 10,500,941 | B2* | 12/2019 | Garcia | F16H 57/037 |
| 10,518,627 | B2* | 12/2019 | Nagpal | B62D 21/11 |
| 10,598,269 | B2* | 3/2020 | Pydin | F04C 2/084 |
| 10,882,389 | B2* | 1/2021 | Kucharski | B60K 6/52 |
| 11,011,959 | B2* | 5/2021 | Pydin | B60K 1/04 |
| 11,065,949 | B2* | 7/2021 | Ziech | B60K 7/0007 |
| 11,155,161 | B2* | 10/2021 | Makino | B60K 17/145 |
| 11,181,180 | B2* | 11/2021 | Matsumoto | A01D 34/6806 |
| 11,247,548 | B2* | 2/2022 | Devreese | B60K 17/346 |
| 11,247,556 | B2* | 2/2022 | Kucharski | B60K 17/165 |
| 11,273,700 | B2* | 3/2022 | Garcia | F16C 19/383 |
| 2004/0149078 | A1* | 8/2004 | Melton | F16H 57/037 74/607 |
| 2013/0192400 | A1* | 8/2013 | Dodo | F16H 57/0476 74/421 A |
| 2018/0297401 | A1* | 10/2018 | Liu | B60K 11/02 |

FOREIGN PATENT DOCUMENTS

| | | |
|---|---|---|
| CN | 103692856 A | 4/2014 |
| JP | S60131319 A | 7/1985 |
| JP | 2001121981 A | 5/2001 |
| JP | 2004352129 A | 12/2004 |

* cited by examiner

PRIOR ART

FIG. 5

AXLE STRUCTURE

CROSS-REFERENCE TO RELATED APPLICATIONS

This is the U.S. national stage of International Application No. PCT/JP2019/009247, filed on Mar. 8, 2019, and claims priority based on Japanese Patent Application No. 2018-042805, filed Mar. 9, 2018.

TECHNICAL FIELD

This disclosure relates to an axle structure, and in particular to an axle structure incorporating a drive motor unit.

BACKGROUND

In vehicles, as a vehicle shaft for front wheels is referred to as a front axle, and a vehicle shaft for rear wheels is referred to as a rear axle, the term axle generally represents the vehicle shaft. As an axle structure, an axle housing through which an axle shaft having both left and right ends connected to vehicle wheels is inserted is utilized. In an electric vehicle, a transaxle structure incorporating a rotary electric machine along with a speed change gear (transmission) and a differential gear is utilized.

Patent Document 1 describes, as an axle structure in prior art, an example axle structure in which a rotary electric machine is disposed parallel to a wheel shaft so as to be offset by a fixed amount from the center of the wheel shaft, and indicates a matter of upsizing related to the rotary electric machine that is projected outward from an axle housing including a transmission and a differential gear. Then, Patent Document 1 discloses a structure in which an axle housing is divided into first and second axle housings, and a stator is attached to the first axle housing to place a rotary electric machine within the first axle housing, while a transmission and a differential gear are placed in the second axle housing.

Patent Document 2 describes a transaxle including a differential gear and two rotary electric machines composed of two hollow motor shafts which are rotatably supported within an axle housing, rotor coils which are disposed on outer circumferences of the motor shafts, and stator coils which are disposed in the axle housing.

CITATION LIST

Patent Literature

Patent Document 1: JP 2001-121981 A
Patent Document 2: JP S60-131319 A

SUMMARY

Technical Problem

When a component including a rotary electric machine combined with a transmission and a differential gear is referred to as a drive motor unit, an axle structure incorporating the drive motor unit can be minimized in size by placing a stator winding of the rotary electric machine in an axle housing. However, this placement results in poor maintainability and serviceability in the event of replacing the drive motor unit or the like. On the other hand, when the rotary electric machine is placed at an offset position outside the axle housing rather than being incorporated in the axle housing, a joint region with the rotary electric machine will receive a heavy load in response to vertical movement caused by a road surface in a case where the axle structure is mounted on a vehicle. Given these circumstances, there is a demand for an axle structure that has improved serviceability in the event of replacing the drive motor unit and also has improved reliability against a load received from a road surface.

Solution to Problem

An axle structure according to the present disclosure includes an axle housing that includes a large diameter housing center portion having a recessed portion which is recessed from an opening portion on a front surface side toward a rear surface side, and a pair of right and left small diameter hollow shaft portions respectively connected to right and left ends of the housing center portion, in which an axle shaft whose right and left ends are connected to wheels is inserted through the axle housing. The axle structure further includes a drive motor unit fitted in the recessed portion and fastened by a bolt.

According to the above-described structure, because the drive motor unit which is fitted in the recessed portion of the axle housing and fastened by the bolt can be easily replaced simply by screwing off the bolt, serviceability is improved. Meanwhile, because the drive motor unit fitted in the recessed portion is fastened integrally with the axle housing, the center of gravity of the drive motor unit approximately coincides with the center of gravity of the axle housing, so that there is no offset between their centers of gravity. This can help reduce a load, such as a load of vertical movement, received from the road surface when the axle structure is mounted on a vehicle, which can, in turn, lead to improved reliability against the load received from the road surface.

Advantageous Effects of Invention

According to the axle structure configured as described above, it becomes possible to improve both serviceability in the event of replacing the drive motor unit, and reliability against the load received from the road surface when the axle structure is mounted on a vehicle.

DESCRIPTION OF EMBODIMENTS

Hereinafter, an embodiment according to the present disclosure will be described in detail with reference to the diagrams. In the following description, an axle structure is explained with respect to a rear axle structure in a vehicle, which is described by way of illustration, and the present disclosure may be applied to a front axle structure depending on a situation.

The shapes, materials, and other features described below are indicated by way of illustration, and may be changed as appropriate in accordance with specifications of the axle structure or the like. In addition, identical components are identified by identical reference numerals throughout the drawings, and descriptions related to these components will not be repeated.

Figure 1:
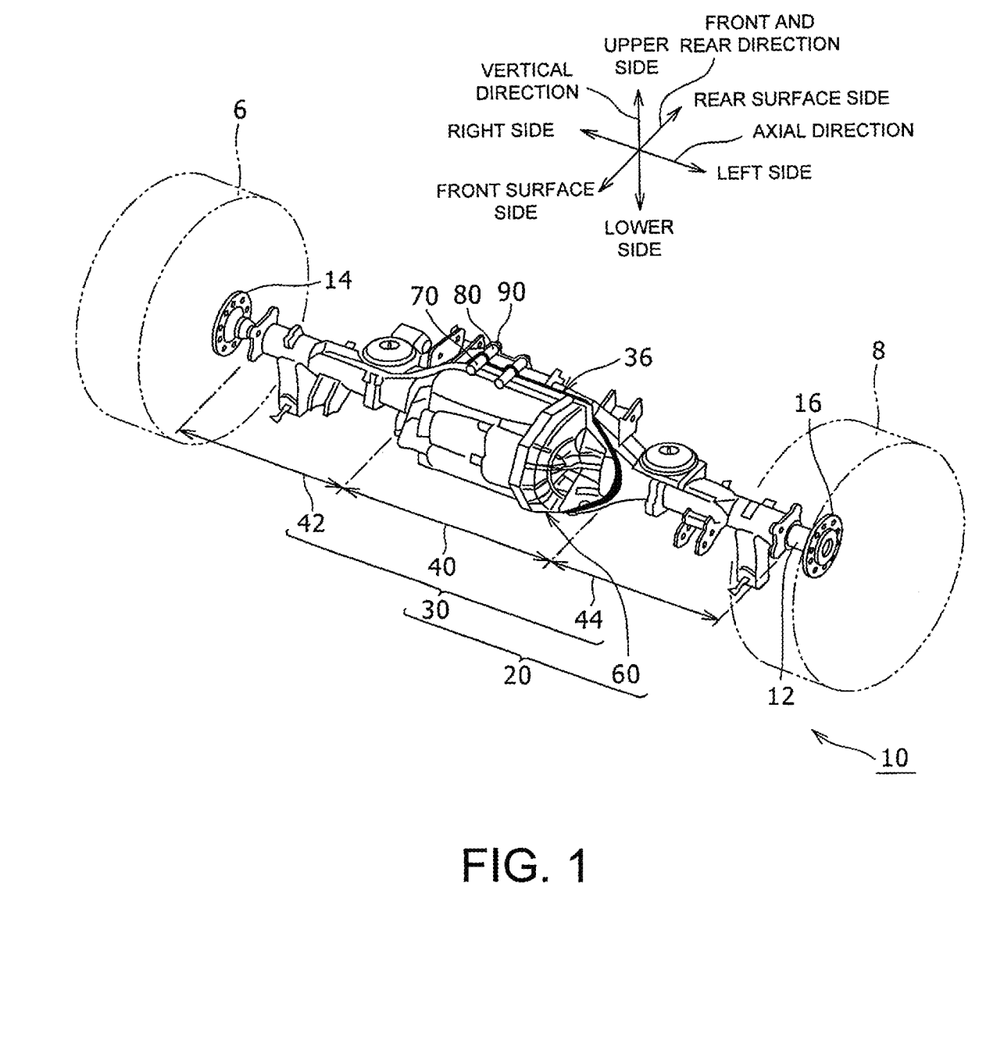
FIG. 1 is a drawing representing a rear axle, viewed from its front surface side, that incorporates an axle structure according to an embodiment.
Figure 2:
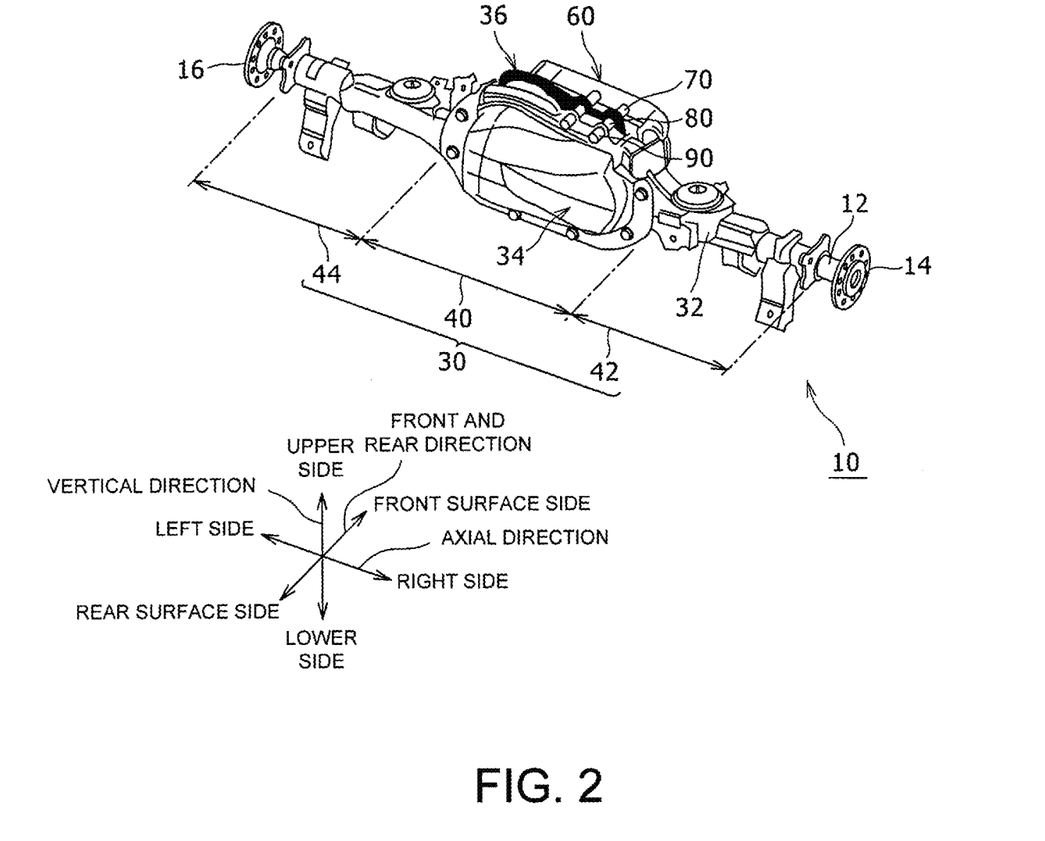
FIG. 2 is a drawing representing the rear axle of FIG. 1, viewed from its rear surface side.

FIGS. 1 and 2 are perspective views representing a rear axle 10 including an axle structure 20. The rear axle 10 includes an axle shaft 12 whose right and left ends are connected to wheels, and the axle structure 20 through which the axle shaft 12 is inserted. The axle structure 20 includes an axle housing 30 and a drive motor unit 60 which is fitted in the axle housing 30 and fixed thereto. The axle shaft 12 has, on both its axial ends, wheel attachment parts 14 and 16. In FIG. 1, a right rear wheel 6 attached to the wheel attachment part 14 and a left rear wheel 8 attached to the wheel attachment part 16 are indicated by chain double-dashed lines. FIGS. 1 and 2 also show other attachment parts in the axle housing 30 in addition to the wheel attachment parts 14 and 16, and the other attachment parts are used for allowing the axle housing 30 to be supported on a vehicle body via a vehicle suspension spring and a shock absorber which are not shown in the drawings.

The drawings referenced below show, as three orthogonal directions of the rear axle 10 and the axle structure 20, an axial direction, a vertical direction, and a front and rear direction. The axial direction is a direction along which the axle shaft 12 extends while being inserted through the axle structure 20. When two directions in the axial direction are distinguished, one side of the axial direction approaching the wheel attachment part 14 for the right rear wheel 6 is referred to as a right side, and the other side of the axial direction approaching the wheel attachment part 16 for the left rear wheel 8 is referred to as a left side. In the vertical direction, a road surface side of the right rear wheel 6 and the left rear wheel 8 is defined as a lower side in a state where the axle shaft 12 with the wheels is assembled, and a side opposite to the road surface side is an upper side. The front and rear direction is a direction orthogonal to the axial direction in a plane whose vertical position is maintained at a constant height. When two directions in the front and rear direction are distinguished, one side of the axle housing 30 where a concave region 48 is provided in a recessed portion 50 of a housing center portion 40, which will be explained below, is referred to as a rear side, and the other side of the axle housing 30 where an opening portion 51 (see FIG. 3) in which the drive motor unit 60 is fitted is provided in the recessed portion 50 is referred to as a front side.

When the axle structure 20 is mounted on a vehicle, the right side of the axle structure 20 corresponds to the right side of the vehicle, and the left side of the axle structure 20 corresponds to the left side of the vehicle. The upper side of the axle structure 20 corresponds to the upper side of the vehicle, and the lower side corresponds to the lower side of the vehicle. For the front and rear direction of the axle structure 20, a correspondence with the front and rear direction of the vehicle differs depending on which side of the front and rear direction of the vehicle is situated on the side where the concave region 48 is provided in the recessed portion 50 or where the opening portion 51 is provided in the recessed portion 50, when the axle structure 20 is mounted on the vehicle. In the description below, the rear surface side of the axle structure 20 which is the side where the concave region 48 is provided in the recessed portion 50 is defined as a vehicle rear side, while the front surface side of the axle structure 20 which is the side where the opening portion 51 is provided in the recessed portion 50 is defined as a vehicle front side. The correspondence is indicated by way of illustration, and in some cases, the rear surface side of the axle structure 20 may be taken as the vehicle front side while the front surface side of the axle structure 20 may be taken as the vehicle rear side in accordance with specifications of the vehicle and the axle structure 20.

Figure 3:
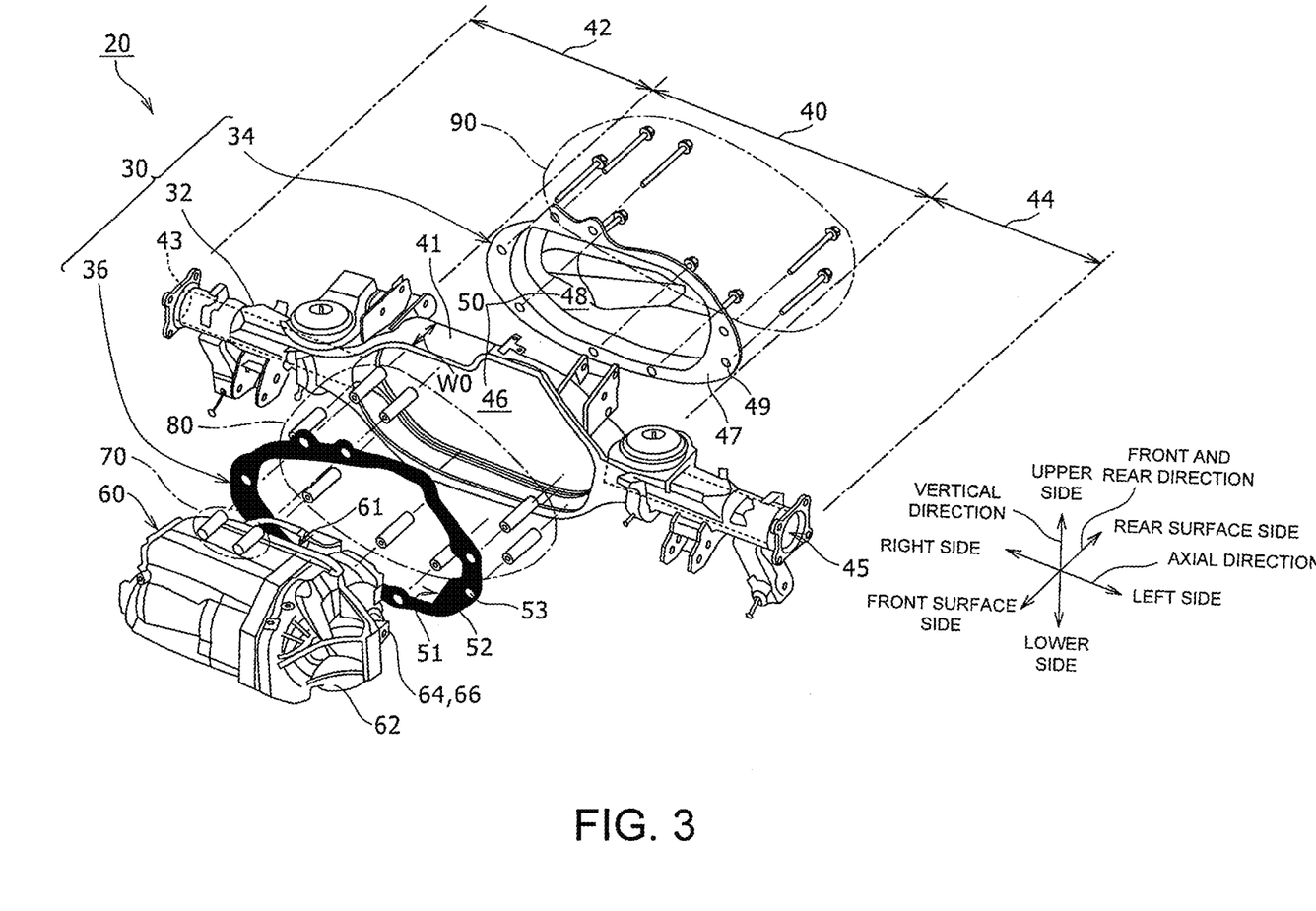
FIG. 3 is an exploded view of the axle structure of FIG. 1.

FIG. 1 is a drawing of the rear axle 10 viewed from a front surface side thereof, and FIG. 2 is a drawing of the rear axle 10 viewed from a rear surface side thereof. Therefore, the left side and the right side on drawing paper change places between FIGS. 1 and 2. Hereinafter, the axle structure 20 will be explained. FIG. 3 is an exploded view of the axle structure 20.

The drive motor unit 60 is a vehicle drive device in which a rotary electric machine 62 is integrally combined with a transmission 64 and a differential gear 66. The drive motor unit 60 rotates the axle shaft 12 via the transmission 64, the differential gear 66, and other units under the control of a not-illustrated vehicle controller, to drive the right rear wheel 6 and the left rear wheel 8 under a predetermined operation condition. As the rotary electric machine 62, a three-phase synchronous rotary electric machine is used.

In the drive motor unit 60, the rotary electric machine 62 is disposed on a front surface side of the drive motor unit 60, and the transmission 64 and the differential gear 66 are disposed on a rear surface side of the drive motor unit 60. A joint region where the transmission 64 and the differential gear 66 are connected to the rotary electric machine 62 is provided with a contact surface 61. The contact surface 61 is an annular contact surface which is arranged so as to surround the transmission 64 and the differential gear 66 which are projectingly disposed on a rear surface side of the rotary electric machine 62. A plurality of fastening members 70 are disposed on the contact surface 61. While FIG. 3 shows two fastening members 70, eight fastening members 70 are provided in total. A female screw which is engaged with a male screw on a fastening bolt 90 is threaded in each of the fastening members 70. Alternatively, a combination of a boss including a bolt through hole, and a nut including the female screw which is engaged with the male screw on the fastening bolt 90, may be utilized.

The axle housing 30 is composed of a housing body portion 32, a cover portion 34, and a front surface side plate 36. The cover portion 34 is fixed by welding to a rear surface side of the housing body portion 32, and the front surface side plate 36 is fixed by welding to a front surface side of the housing body portion 32. The axle housing 30 is a composite component in which the housing body portion 32, the cover portion 34, and the front surface side plate 36 are integrated.

The integrated axle housing 30 includes a housing center portion 40 having a large diameter that is located at the center in an axial direction of the axle housing 30 and a pair of right and left hollow shaft portions 42 and 44 having a small diameter that are connected to right and left ends of the housing center portion 40.

The housing center portion 40 is a polygonal annular portion which surrounds a hollow placement space 46 with a frame body 41 having a plate width W0 that is obtained by shaping a steel plate having the plate width W0 along the front and rear direction into a polygonal geometry analogous to an ellipse.

The cover portion 34 is a cap member formed by die-cutting a steel plate into a predetermined outline shape and rearwardly depressing a portion of the steel plate that is surrounded by a flat rim region 47 on an outer circumference, to form the concave region 48. An outline shape of the rim region 47 is designed to match an outline shape of the annular contact surface 61 of the drive motor unit 60, and an inner opening shape of the rim region 47 is designed to match a polygonal opening shape of the hollow placement space 46 in the housing center portion 40. In the rim region 47, bolt through holes 49 are defined in a predetermined positional relationship. The predetermined positional relationship is determined so as to be identical to a positional relationship of the fastening members 70 in the drive motor unit 60, and the number of the bolt through holes 49 is eight, which is equal to the number of the fastening members 70 in the drive motor unit 60.

The cover portion 34 is placed so as to cover the hollow placement space 46 in the housing center portion 40 from its rear surface side, and is integrally fixed to a rear surface side of the frame body 41 by welding. The contour of the rim region 47 in the cover portion 34 is greater than the contour of the polygonal annular portion in the housing center portion 40, which causes the rim region 47 of the cover portion 34 to function as a rear flange of the housing center portion 40 when the cover portion 34 is integrally combined with the frame body 41. Accordingly, the eight bolt through holes 49 in the cover portion 34 function as eight bolt through holes 49 defined in the rear flange of the housing center portion 40.

The front surface side place 36 is a flat plate member formed by die-cutting a steel plate into a predetermined outline shape and further die-cutting a central portion of the steel plate that is surrounding by a rim region 52 on an outer circumference into a predetermined opening shape. An outline shape of the rim region 52 and the inner opening shape are designed to match the annular shape of the contact surface 61 in the drive motor unit 60. In the rim region 52, bolt through holes 53 are defined in a predetermined positional relationship. The predetermined positional relationship is determined so as to be identical to the positional relationship of the fastening members 70 in the drive motor unit 60, and the number of the bolt through holes 53 is eight, which is equal to the number of the fastening members 70 in the drive motor unit 60.

The front surface side plate 36 is disposed on the front surface side of the hollow placement space 46 in the housing center portion 40, and integrally fixed to a front surface side of the frame body 41 by welding. The contour of the rim region 52 in the front surface side plate 36 is greater than the contour of the polygonal annular portion of the housing center portion 40, which causes the rim region 52 of the front surface side plate 36 to function as a front flange of the housing center portion 40 when the front surface side plate 36 is integrally combined with the frame body 41. Accordingly, the eight bolt through holes 53 in the front surface side plate 36 function as eight bolt through holes 53 defined in the front flange of the housing center portion 40.

When the cover portion 34 is welded to the rear surface side of the frame body 41 in the housing center portion 40 and the front surface side plate 36 is welded to the front surface side of the frame body 41 in the housing center portion 40, the eight bolt through holes 49 in the cover portion 34 and the eight bolt through holes 53 in the front surface side plate 36 are positioned so as to be aligned with each other.

In a state where the cover portion 34 and the front surface side plate 36 are integrally fixed to the rear surface side and the front surface side of the frame body 41 in the housing center portion 40, respectively, the housing center portion 40 has the recessed portion 50 which is recessed from the opening portion 51 of the front surface side plate 36 toward the rear surface side. The recessed portion 50 is composed of the hollow placement space 46 having a depth WO along the front and rear direction and the concave region 48 of the cover portion 48. The recessed portion 50 is a space in which the drive motor unit 60 is fitted.

Returning to the structure of the axle housing 30, the housing body portion 32 has the pair of right and left small diameter hollow shaft portions 42 and 44 which are joined to the right and left ends of the housing center portion 40. The hollow shaft portion 42 is a vehicle shaft pipe having a shaft hole 43 through which a right rear wheel 6 side of the axle shaft 12 is inserted. One end of the shaft hole 43 is open to the outside at the right end of the housing body portion 32, and the other end of the shaft hole 43 is open to the hollow placement space 46 of the housing center portion 40. The hollow shaft portion 44 is a vehicle shaft pipe having a shaft hole 45 through which a left rear wheel 8 side of the axle shaft 12 is inserted. One end of the shaft hole 45 is open to the outside at the left end of the housing body portion 32, and the other end of the shaft hole 45 is open to the hollow placement space 46 of the housing center portion 40. The outer shaft diameters of the hollow shaft portions 42 and 44 are smaller than a short diameter of the substantially elliptic shape of the housing center portion 40. Conversely, the housing center portion 40 is greater in diameter than the hollow shaft portions 42 and 44.

The hollow shaft portions 42 and 44 are obtained by integrating a plurality of members, which are composed of steel plates formed in predetermined shapes, into one unit through welding or other means. The hollow shaft portions 42 and 44 are integrally combined with the housing center portion 40 by welding to constitute the housing body portion 32. The cover portion 34 and the front surface side plate 36 are attached to the housing body portion 32 through welding to thereby form the axle housing 30, and the axle housing 30 includes, in the central region, the large diameter housing center portion 40, and also includes the hollow shaft portions 42 and 44 disposed on both axial ends of the housing center portion 40. Because such a shape of the axle housing 30 has a strong resemblance to a musical instrument called a banjo, the axle housing 30 is commonly known as a banjo type axle housing.

Fastening collars 80 and the fastening bolts 90 are used for integrally combining the axle housing 30 with the drive motor unit 60. The fastening collars 80 are columnar members, each having a through hole through which the fastening bolt is inserted. The length of the fastening collars 80 is defined to be equal to or slightly smaller than the plate width WO of the frame body 41 in the housing center portion 40. The number of the fastening collars 80 is eight, which is equal to the number of the fastening members 70 in the drive motor unit 60. The fastening bolt 90 is a headed bolt, and a length of a shank portion of the bolt is equal to a value of {(the thickness of the rim region 47 of the cover portion 34)+(the length of the fastening collar 80)+(the thickness of the rim region 52 of the front surface side plate 36)+(a fastened length of the drive motor unit 60 in the fastening member 70)}. A washer may be used with the fastening bolt 90. In this case, the length of the shank portion of the fastening bolt 90 is extended by an amount corresponding to the thickness of the washer.

Procedural steps of placing and fixing the drive motor unit 60 in the axle housing 30 are as follows. In the housing center portion 40, the eight fastening collars 80 are respectively placed between the eight bolt through holes 49 in the cover portion 34 and the eight bolt through holes 53 in the front surface side plate 36. Next, the eight fastening bolts 90 are respectively inserted through the eight bolt through holes 49 in the cover portion 34, the eight fastening collars 80, and the bolt through holes 53 in the front surface side plate 36. Then, the annular contact surface 61 of the drive motor unit 60 is brought into contact with a front surface of the front surface side plate 36. While bringing them into contact, tip ends of the fastening bolts 90 projected from the bolt through holes 53 in the front surface side plate 36 are respectively aligned with the eight fastening members 70 disposed on the contact surface 61. In this state, the axle housing 30 is held together with the drive motor unit 60, and is bolt fastened to the eight fastening members 70 by means of the eight fastening bolts 90. As a result, the drive motor unit 60 is fitted in the depressed portion 50 in the housing center portion 40 of the axle housing 30 and integrally fixed thereto through bolt fixation. All procedures for bolt fixation can be completed outside the housing body portion 32.

Figure 4:
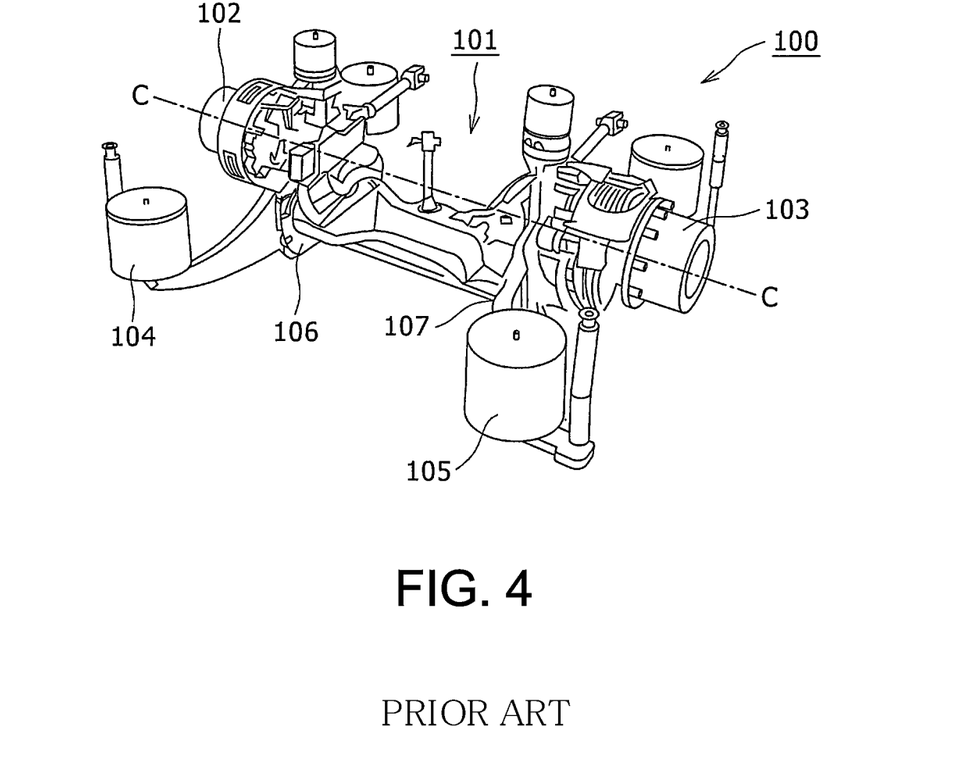
FIG. 4 is a perspective view showing an axle structure in prior art which is of a rigid type incorporating two drive motor units.
Figure 5:
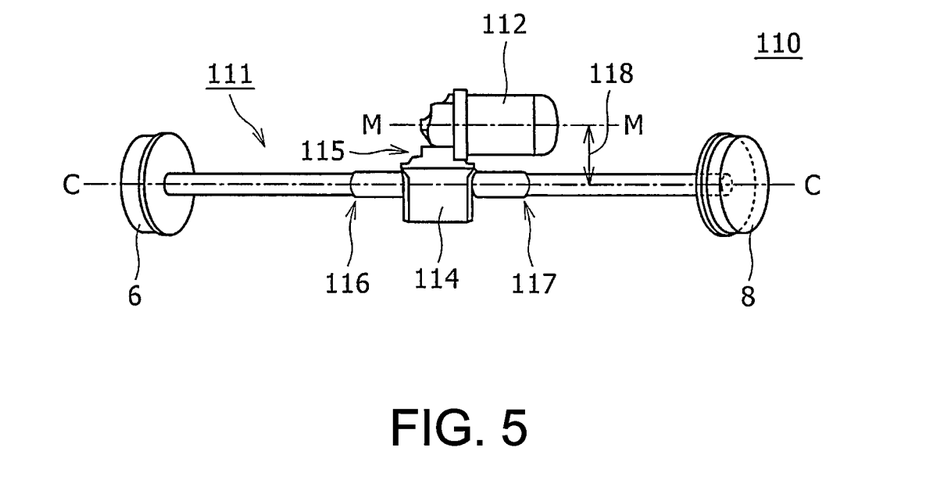
FIG. 5 is a perspective view showing an axle structure incorporating a single rotary electric machine which is arranged so as to be offset from an axle housing in prior art.

Effects obtained by the above-described structure will be further described in detail compared with conventional techniques shown in FIGS. 4 and 5. An axle structure 100 illustrated in FIG. 4 has a structure in which a rigid body 101 having an axial direction indicated with reference sign C-C is fastened via rigid joint portions 106 and 107 to two drive motor units 102 and 103 and peripheral components, such as two suspensions 104 and 105.

To replace the drive motor unit 102, 103, for example, in the axle structure 100, the peripheral components, such as the suspension 104, 105, must be detached from the rigid joint portions 106, 107 by releasing fixation thereto, which results in poor serviceability during maintenance work. In addition, the axle structure 100 includes a plurality of components which are disposed along the axial direction and joined to the axle structure 100 by means of fastening members, such as the rigid joint portions 106 and 107, and not-illustrated weld zones. Therefore, in a case where the axle structure 100 is mounted on a vehicle, stress is apt to be concentrated on the fastening members and the weld zones by the action of a bending input, such as a vertical movement or a lateral movement, received from a load surface, which means that a problem associated with strength against the load and reliability still remains unsolved in the axle structure 100.

In an axle structure 110 illustrated in FIG. 5, a rotary electric machine 112 having a central axis indicated with reference sign M-M and a power converting unit 114 including a transmission and a differential gear are disposed on a rigid body 111 having an axle axial direction indicated with reference sign C-C, and the rigid body 111 further includes a fastening member 115 and weld zones 116 and 117. The power converting unit 114 is aligned with the axial direction, while the central axis M-M of the rotary electric machine 112 is displaced from the axial direction C-C by an offset 118. The rotary electric machine 112 is fastened to the rigid body 111 by the fastening member 115.

In the axle structure 110, the center of gravity of the rigid body 111 is separated from the center of gravity of the rotary electric machine 112 by the offset 118. Therefore, in a case where the axle structure 110 is mounted on a vehicle, a load on the fastening member 115 is increased in response to a load of a vertical movement caused by a road surface. In addition, because a casing of the power converting unit 114 is a casting, interference from the road surface may cause the power converting unit 114 to receive a load of the interference. In consideration with this situation, the axle structure 110 still has a problem associated with strength against the load and reliability.

In contrast to the above structures, the axle structure 20 described with reference to FIGS. 1 to 3 has the drive motor unit 60 which can be detached simply by removing the eight fastening bolts 90, and is therefore improved in serviceability during maintenance work, such as replacement of the drive motor unit 60.

In addition, because the axle housing 30 is of a so-called banjo type and composed of the steel plate, joints by means of fastening and welding can be reduced in the axle axis direction, or in some cases can be eliminated entirely. In this way, even when the bending input, such as a vertical movement or a lateral movement, is exerted from the road surface on the axle structure 20 that is mounted on a vehicle, stress concentration can be circumvented.

Further, the drive motor unit 60 is fitted in the recessed portion 50 of the housing center portion 40 in the axle housing 30 and fastened thereto by means of the bolts, which allows the center of gravity of the axle housing 30 to substantially coincide with the center of gravity of the drive motor unit 60, so that there is almost no offset between the centers of gravity. Still further, because the drive motor unit 60 is fitted in the axle housing 30 formed of the steel plate, a component which may receive the interference from the road surface when the axle structure 20 is mounted on a vehicle is the housing center portion 40 which is not a casting but is formed of the steel plate. This contributes to improved strength against the load received from the road surface and improved reliability of the axle housing 30 in the case where the axle housing 30 is mounted on a vehicle. As a result, a motor case in the drive motor unit 60 may be formed of an aluminum alloy casting, which can help reduce the weight of the drive motor unit 60.

The invention claimed is:
1. An axle structure, comprising:
an axle housing that comprises
a large diameter housing center portion including a recessed portion which is recessed from an opening portion on a front surface side toward a rear surface side of the axle housing, and
a pair of right and left small diameter hollow shaft portions which are connected to right and left ends of the large diameter housing center portion, respectively, wherein an axle shaft whose right and left ends are connected to wheels is inserted through the axle housing; and
a drive motor unit fitted in the recessed portion and fastened by a plurality of bolts, wherein:
the recessed portion is formed so as to
include, in the large diameter housing center portion, a hollow placement space in a polygonal cylindrical portion surrounded by a frame body, and
include, on a rear surface side of a cover portion disposed on a rear surface side of the frame body, a concave region which is depressed to be in an inner opening shape corresponding to an opening shape of the hollow placement space in the polygonal cylindrical portion;
the cover portion comprises a flat rim region on an outer circumference side of the concave region, the flat rim region having a contour greater than that of the polygonal cylindrical portion, wherein a plurality of bolt through holes is defined in the flat rim region;
the drive motor unit comprises, on a contact surface, a plurality of fastening members having a positional relationship identical to a positional relationship of the plurality of bolt through holes in the cover portion, the contact surface being brought into contact with a front surface side of the large diameter housing center portion; and in a state where the plurality of bolt through holes in the cover portion is aligned with the plurality of fastening members in the drive motor unit, the cover portion is fastened to the drive motor unit by the plurality of bolts.

2. The axle structure according to claim 1,
wherein the rear surface side of the frame body is welded to the cover portion.

3. The axle structure according to claim 1, further comprising:

a plurality of cylindrical collars disposed between the flat rim region and a surface of a protrusion portion protruding from an outer surface of the drive motor unit, the surface of the protrusion portion being opposite to the contact surface, wherein the plurality of bolts passes through the plurality of cylindrical collars.

* * * * *